United States Patent
Heyl (10) Patent No.: US 11,312,393 B2
(45) Date of Patent: Apr. 26, 2022

(54) ARTIFICIALLY FALSIFYING SENSOR DATA TO INITIATE A SAFETY ACTION FOR AN AUTONOMOUS VEHICLE

(71) Applicant: Robert Bosch GmbH, Stuttgart (DE)

(72) Inventor: Andreas Heyl, Renningen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/888,365

(22) Filed: May 29, 2020

(65) Prior Publication Data

US 2021/0370986 A1    Dec. 2, 2021

(51) Int. Cl.
*B60W 60/00* (2020.01)
*B60W 30/08* (2012.01)
*G06K 9/62* (2006.01)
*G01C 21/32* (2006.01)
*G06K 9/00* (2006.01)

(52) U.S. Cl.
CPC ...... *B60W 60/00188* (2020.02); *B60W 30/08* (2013.01); *G01C 21/32* (2013.01); *G06K 9/00791* (2013.01); *G06K 9/6288* (2013.01); *G05B 2219/34374* (2013.01)

(58) Field of Classification Search
None
See application file for complete search history.

(56) References Cited

U.S. PATENT DOCUMENTS

| | | | |
|---|---|---|---|
| 9,956,961 B2 | 5/2018 | Ishikawa | |
| 2008/0077321 A1* | 3/2008 | Widodo | G01C 21/32 701/29.5 |
| 2015/0266488 A1 | 9/2015 | Solyom et al. | |
| 2017/0233231 A1* | 8/2017 | Gariepy | G05D 1/0238 701/2 |
| 2018/0299284 A1 | 10/2018 | Wang | |
| 2018/0376306 A1 | 12/2018 | Ramalho de Oliveira | |
| 2019/0096238 A1 | 3/2019 | Ran et al. | |
| 2019/0186931 A1 | 6/2019 | Dittmer et al. | |
| 2019/0187706 A1 | 6/2019 | Zhou | |

(Continued)

FOREIGN PATENT DOCUMENTS

EP    3477259 A1    5/2019

OTHER PUBLICATIONS

Autonomous vehicles: https://en.wikipedia.org/wiki/Vehicular_automation (printed May 28, 2020).

(Continued)

*Primary Examiner* — Dale W Hilgendorf
*Assistant Examiner* — Alexander C. Bost
(74) *Attorney, Agent, or Firm* — Michael Best & Freidrich LLP (57) ABSTRACT

Methods and systems for controlling a vehicle. The system includes a localization system, a memory storing a digital map, at least one sensor, and an electronic processor. The electronic processor is configured to receive, from the localization system, a current location of the vehicle and determine a future driving segment of the vehicle based on the current location of the vehicle. The electronic processor is further configured to determine at least one performance limitation based on the future driving segment of the vehicle and artificially falsify data of the at least one sensor to initiate a safety action for the vehicle.

20 Claims, 4 Drawing Sheets

(56) References Cited

U.S. PATENT DOCUMENTS

| | | | |
|---|---|---|---|
| 2019/0232955 A1 | 8/2019 | Grimm et al. | |
| 2020/0406908 A1* | 12/2020 | Soryal | B60W 50/023 |
| 2021/0053580 A1* | 2/2021 | Horiguchi | B60W 50/0205 |
| 2021/0096571 A1* | 4/2021 | Modalavalasa | G05D 1/0214 |
| 2021/0166474 A1* | 6/2021 | Behar | G06F 30/20 |

OTHER PUBLICATIONS

Harsha Vardhan "HD maps: New age maps powering autonomous vehicles" (Sep. 22, 2017) (https://www.geospatialworld.net/article/hd-maps-autonomous-vehicles).

Deepmap—HD Mapping and Localization for Safety Autonomy; https://www.deepmap.ai (2019).

GIDAS: German In-Depth Accident Study; https://www.gidas.org (2016).

* cited by examiner

ARTIFICIALLY FALSIFYING SENSOR DATA TO INITIATE A SAFETY ACTION FOR AN AUTONOMOUS VEHICLE

Embodiments relate to map-based prediction and mitigation actions when sensor limitations and challenging driving situations arise in autonomous vehicles.

FIELD

Embodiments relate to map-based prediction and mitigation actions when performance limitations and challenging driving situations arise in autonomous vehicles.

SUMMARY

Behavior planning for autonomous vehicles has included handling uncertainty regarding the state and dynamic of the driving environment, such as aleatoric or random uncertainty of sensor measurements (or the loss of one or more sensors' functionality) or epistemic uncertainty related to models used in the algorithms for creating a driving environment model of the vehicle. If the uncertainty in these measurements reaches a certain level, actions are taken to ensure the safety of the vehicle by reducing the uncertainty or preventing hazards related to the uncertainty.

Additionally, challenging driving situations can arise that raise the uncertainty of sensor measurements or present complex decisions for the autonomous vehicle. For example, the vehicle may be driving in an area with high vehicle accident statistics or close to a large gathering place that may have high pedestrian traffic. Just as with human drivers, these driving situations can present more challenging driving situations for the autonomous vehicle. A solution is needed to help control autonomous vehicles when sensor data is uncertain or the vehicle is presented with challenging driving situations.

Therefore, among other objects, one object of some embodiments is to control a vehicle.

One embodiment provides a system for controlling a vehicle. The system includes a localization system, a memory storing a digital map, at least one sensor, and an electronic processor. The electronic processor is configured to receive, from the localization system, a current location of the vehicle and determine a future driving segment of the vehicle based on the current location of the vehicle. The electronic processor is further configured to determine at least one performance limitation based on the future driving segment of the vehicle and artificially falsify data of the at least one sensor to initiate a safety action for the vehicle.

Another embodiment provides a method for method for controlling a vehicle. The method includes receiving, with an electronic processor, a current location of the vehicle from a localization system and determining, with the electronic processor, a future driving segment of the vehicle based on the current location of the vehicle. The method further includes determining, with the electronic processor, at least one performance limitation based on the future driving segment of the vehicle and artificially falsifying, with the electronic processor, data of at least one sensor to initiate a safety action for the vehicle.

Another embodiment provides a non-transitory, computer-readable medium containing instructions that, when executed by an electronic processor, are configured to perform a set of functions, the set of functions including receiving a current location of the vehicle from a localization system and determining a future driving segment of the vehicle based on the current location of the vehicle. The set of functions further includes determining at least one performance limitation based on the future driving segment of the vehicle and artificially falsifying data of at least one sensor to initiate a safety action for the vehicle These and other features, aspects, and advantages will be apparent from a reading of the following detailed description and a review of the associated drawings. It is to be understood that both the foregoing general description and the following detailed description are explanatory and do not restrict aspects as claimed.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figure 1:
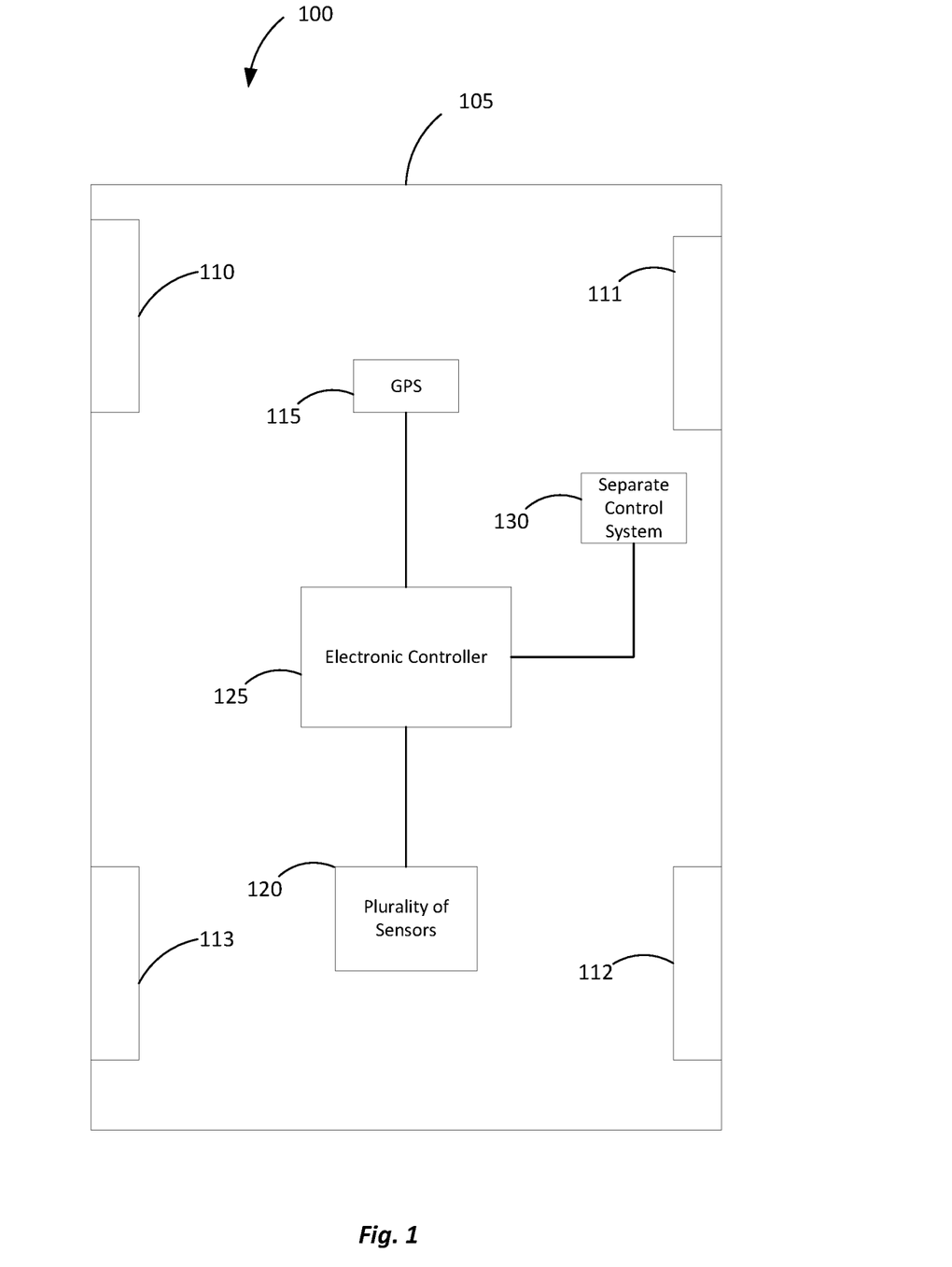
FIG. 1 illustrates a system for controlling a vehicle according to one embodiment.

FIG. 1 illustrates a system 100 for controlling a vehicle 105 according to one embodiment. The vehicle 105 is illustrated with four wheels 110-113 (such as an automobile, truck, or other vehicle), but may contain more or less wheels than illustrated. For example, the vehicle 100 may be a motorcycle and may only have two wheels. The vehicle 100, in some embodiments, is an autonomous vehicle.

The system 100 also includes a localization system 115, a plurality of sensors 120, an electronic controller 125, and optionally a separate control system 130. The localization system 115 is configured to determine a real-world position of the vehicle 100. This is accomplished, for example, by using a global positioning system ("GPS") or other system to determine the real-world position of the vehicle 100.

The plurality of sensors 120 include various sensors common on vehicles, such as cameras, LIDAR sensors, radar sensors, UV sensors, microphones, and others. The plurality of sensors 120 are positioned at various locations on the vehicle 100. For example, cameras may be placed such that one camera is positioned to capture video data of the driving environment in front of the vehicle 100 and one camera is positioned to capture video data of the driving environment behind the vehicle 100. However, it is to be understood that any type of sensor can be placed at any location on the vehicle 100.

Figure 2:
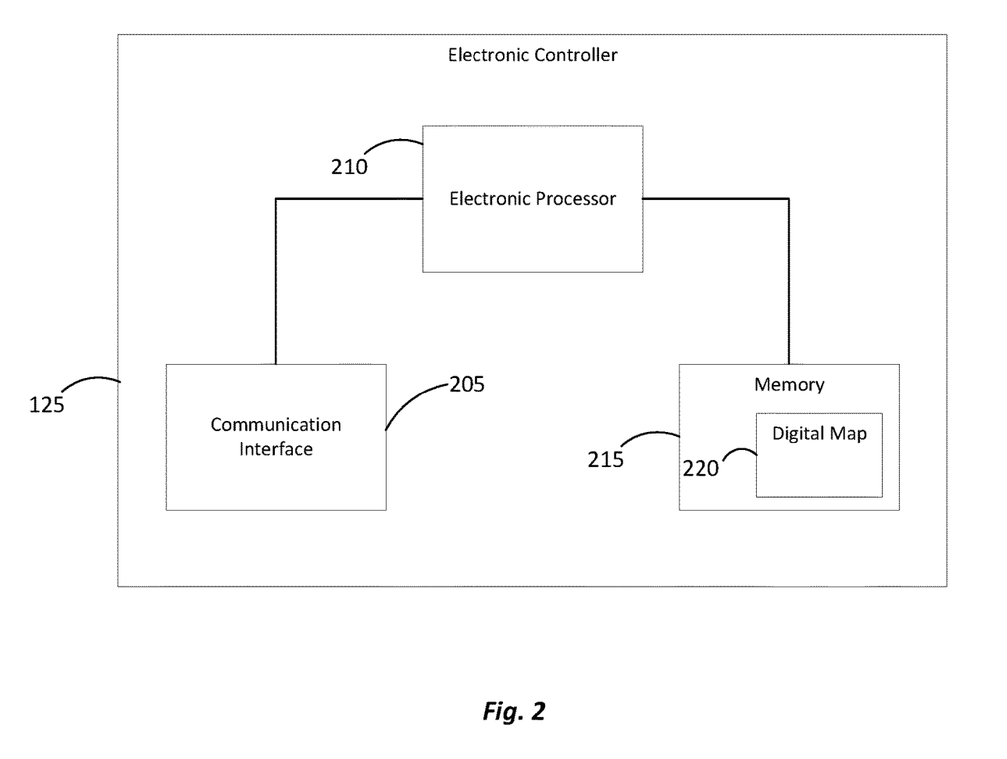
FIG. 2 illustrates an electronic controller according to one embodiment.

The electronic controller 125 is communicatively coupled to, amongst other things, the localization system 115 and the plurality of sensors 120. An example of the electronic controller 125 is illustrated in FIG. 2. The electronic controller 125 includes a communication interface 205, an electronic processor 210, and a memory 215. The communication interface 205 allows the electronic controller 125 to communicate with external hardware, such as the localization system 115 and the plurality of sensors 120. The communication interface 205 also allows the electronic controller 125 to communicate with remote servers to access data for operation of the system 100. For example, a remote server may include map data accessible by the electronic controller 125 to, among other things, perform the methods and functions described herein when executed by the electronic processor 210. In some embodiments, the communication interface 205 includes wired interface hardware (e.g., one or more ports, pins, and the like), wireless interface hardware (e.g., one or more transceivers, antennas, and the like), or a combination thereof.

The electronic processor is communicatively coupled to the communication interface 205 and the memory 215. The electronic processor 210 is configured to access the memory 215 and, among other things, execute instructions for the system 100. The electronic processor 210 may be a microprocessor, an application-specific integrated circuit, or similar processing circuit. The memory 215 is a non-transitory, computer-readable medium and contains data and instructions that, when executed by the electronic processor 210, perform the methods and functions described herein.

In one embodiment, the memory 215 includes a digital map 220. The digital map 220 includes data about various driving routes for the vehicle 105. This data may include road geometry data, driving lane data, traffic data, weather data, and the like. In some embodiments, the digital map 220 is periodically updated (e.g., based on communications via the communication interface 205 with one or more of a remote server, the sensors 120, and the localization system 115) to keep the data accurately reflecting the current driving situation of the vehicle 10. In some embodiments, the digital map 220 may be stored on a remote server accessible via the communication interface 205 instead of in the memory 215.

The data contained in the digital map 220 can be classified as either static data or dynamic data. Static data includes properties of the driving environment unlikely to rapidly change, such as a number and orientation of driving lanes for a driving segment, locations of radar-reflecting guardrails or metal plates, locations of LIDAR-reflecting mirrors or windows, locations of billboards that may cause cameras to operate incorrectly, locations of other camera-interfering objects, and the like. Dynamic data includes various environmental conditions such as adverse environmental conditions (e.g., sun glare, snow, fog, rain, darkness, all of which can inhibit proper function of sensors) and traffic scenarios.

This data may be gathered by the electronic processor 210 through the use of other autonomous vehicles, crowd-sourcing, swarm-sourcing, or from various other sources, such as weather services, traffic services, and the like. Additionally, offline analysis of the digital map 220, either manually or utilizing artificial intelligence, may identify various features of driving segments that may present these various problems to the vehicle 105. The data is then stored as map attributes for each driving segment.

Driving segments may then be classified, by either the electronic processor 210 or by a remote processing system, such as a remote server, based on these different map attributes. Classification may be performed by using a look-up table that relates particular map attributes to particular classifications, machine learning that uses map attributes as input and provides a classification as an output, or a set of rules that associate different sets of map attributes with different classifications. The classification may be a binary classification (e.g., "limitation of one or more sensors is likely" vs. "no limitation"), a quality class classification (e.g., "very high," "high," "medium," and "low"), an individual sensor quality class classification (e.g., "Quality Class of the Right Front LIDAR Sensor: Medium"), or a redundancy classification (e.g., "only one sensor available for radar functionality"). These classifications are also stored with the digital map 220 for each driving segment. In some embodiments, the classifications can be extended to classify performance limitations depending on particular environmental conditions. For example, some sensors may be limited by time of day (e.g., cameras not working as effectively at night or glare from sunrise or sunset obscuring cameras) or weather (e.g., LIDAR sensors not working properly during rain or snow or cameras being limited by fog). In some embodiments, under certain conditions, planning algorithms, prediction algorithms, or perception algorithms (e.g., algorithms executed by the electronic controller 125 to control the vehicle 105, plan driving routes for the vehicle 105, and perceive objects in the driving environment of the vehicle 105) may have limitations, even if the plurality of sensors 120 provide accurate data. For example, some planning algorithms may be unsuited for controlling the vehicle 105 in particular weather conditions, and may output driving behavior plans that are not suitable for controlling the vehicle 105 in these weather conditions. In another example, some algorithms may perform poorly when multiple pedestrians are in the driving environment of the vehicle 105 (e.g., when multiple pedestrians are crossing a street in different directions).

In some embodiments, each classification may also be assigned a probability based on the one or more environmental factors. For example, a driving segment may, on a sunny day during daylight hours, present no performance limitations. However, as daylight fades, there may be a higher probability that sensor data (such as from cameras) or algorithm is inaccurate and, thus, that a performance limitation is present. Therefore, in some embodiments, classifications may be made and then assigned different probabilities of being present based upon, for example, time of day or weather factors.

In some embodiments, map attributes may also include performance limitations caused by traffic situations, such as a long convoy of large vehicles (which may obscure radar, LIDAR, and cameras) or special events, such as smoke from wildfires or other incidental performance limitations. These attributes can be identified based either by querying a remote server for information or via one or more other sensors of the vehicle 105 "looking ahead" of the vehicle 105.

The digital map 220 may also have attributes indicating challenging driving situations. These challenging driving situations may be static or dynamic. For example, static (or "a priori") challenging driving situations may include areas with high vehicle accident rates or areas with complex road geometry, such as multi-lane roundabouts or interchanges. Dynamic challenging driving situations may include areas with high pedestrian traffic only during certain events (such as roads outside athletic stadiums) or changing traffic situations, such as traveling at high speeds.

Returning to FIG. 1, the system 100 also optionally includes the separate control system 130. In some embodiments, the electronic controller 125 is a general control system for the vehicle 105, and performs both the methods and functions recited herein and also performs general control functions for the vehicle 105, such as controlling speed, direction, and other vehicle functions. For example, the electronic controller 125 communicates control signals to and receives feedback from one or more of an acceleration system, braking system, and steering system of the vehicle 105 via the communication interface 205. In this embodiment, the separate control system 130 is not provided as the functionality of the separate control system 130 is incorporated into the electronic controller 125. In other embodiments, the electronic controller 125 is tasked only with performing the methods and functions described herein, and is communicatively coupled with the separate control system 130 to provide sensor data (for example, determined performance limitations (discussed below), raw sensor data, processed sensor data, and the like) to the separate control system 130, which in turn uses the sensor data to control the vehicle 105.

Figure 3:
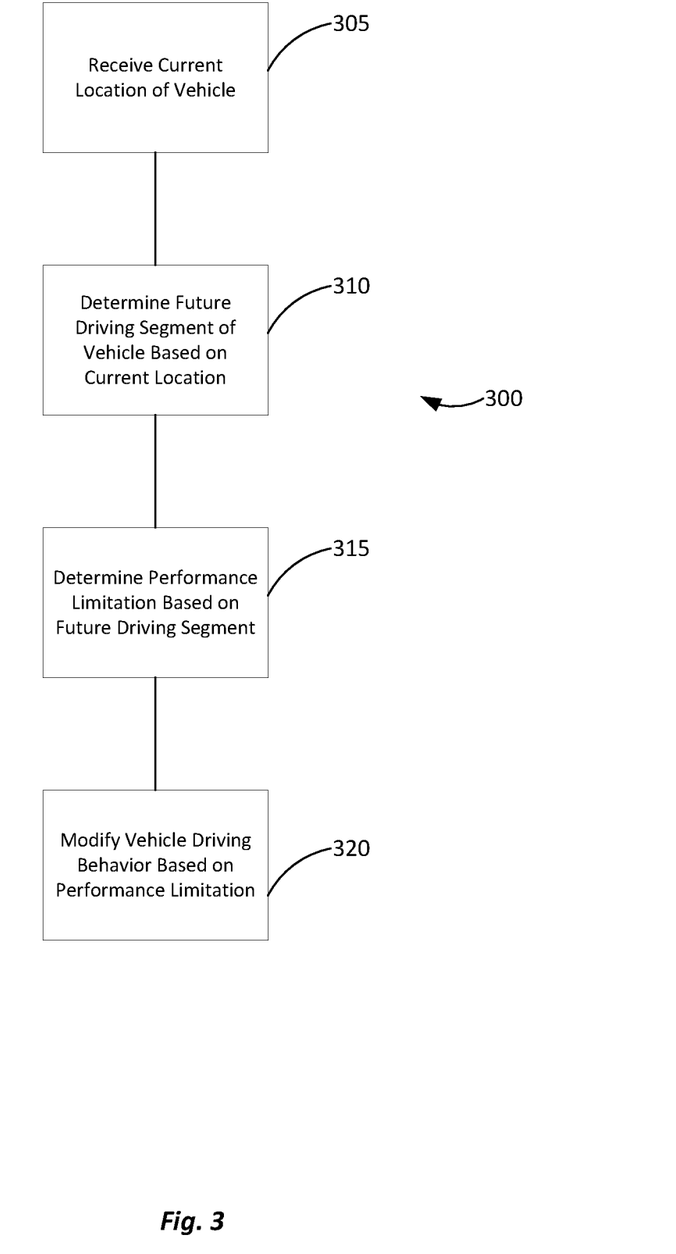
FIG. 3 illustrates a method for controlling a vehicle according to one embodiment.

FIG. 3 illustrates a method 300 for controlling the vehicle 105 according to one embodiment. The method 300 includes receiving, with the electronic processor 210, a current location of the vehicle 105 from the localization system 115 (block 305). For example, the localization system 115 receive signals via an antenna from global positioning satellites, land-based radio towers, and the like; processes those signals (e.g., using trilateration) to determine a current location; and provides the current location to the electronic processor 210.

The electronic processor 210 then determines a future driving segment of the vehicle 105 based on the current location of the vehicle 105 (block 310). For example, the electronic processor 210 may determine the future driving segment by selecting a driving segment ahead of the current location of the vehicle 105 on the same road. In some embodiments, instead of looking to a future driving segment on the same road, the electronic processor 210 may instead access a planned driving route of the vehicle 105 from the memory 215, and select an upcoming driving segment on the planned driving route as the future driving segment. The selected upcoming driving segment on the planned driving route may be on the same road or on a different road on which the vehicle 105 is currently traveling.

Whether selecting a future driving segment on a planned driving route or merely ahead of the vehicle on the same road without a planned route, the future driving segment may be selected based on a range of factors. For example, in some embodiments, the electronic processor 210 selects the future driving segment based on current vehicle, time of day, weather conditions, and the like. With respect to vehicle speed, generally, the faster the vehicle is traveling, the further ahead of the vehicle along the driving route or ahead of the vehicle on the current road that the electronic processor selects as the future driving segment. In some embodiments, the future driving segment is selected such that any performance limitations that may be present in the future driving segment are accounted for before the limitations are encountered.

As part of determining the future driving segment in block 310, the electronic processor 210 also determines classifications of that future driving segment. For example, the electronic processor 210 may access the digital map 220 (e.g., using the future driving segment as an input to access the digital map 220), and obtain from the digital map 220 classifications for the future driving segment. The future driving segment may be determined and analyzed for classifications before the vehicle 105 begins on the planned driving route, while the vehicle 150 is in operation, or both to obtain initial classifications and then obtain updates that may occur in the intervening time before the vehicle arrives at future driving segment.

Based on the classifications assigned to the future driving segment, the electronic processor 210 determines performance limitations for the future driving segment (block 315). For example, as described above, on certain driving segments, large billboards or metal guardrails may cause particular sensors, such as radar or LIDAR, to return inaccurate data or may cause particular algorithms to perform poorly. In some embodiments, the electronic processor 210 determines that a future driving segment only has one performance limitation. In other embodiments, the electronic processor 210 determines that a future driving segment has multiple performance limitations, for example, for a variety of sensors of the plurality of sensors 120.

The method 300 also includes modifying, with the electronic processor 210, a driving behavior of the vehicle 105 based on the performance limitations (block 320). The driving behavior of the vehicle 105 may include steering direction, vehicle speed, and other components, such as rules controlling where and how the vehicle 105 operates. When performance limitations exist, the driving behavior of the vehicle 105 is modified to, for example, maintain safety standards despite the limitations. Therefore, mitigation measures (e.g., modifications to driving behavior) are implemented to account for the limitations.

Potential driving behavior modifications that can be implemented to mitigate the performance limitations may include setting a preference of a lateral position in a driving lane for the vehicle 105. For example, the electronic processor 210 may set a preference of staying to the right side of the driving lane (in locations where right-side driving is law) to allow the vehicle 105 to more efficiently exit the current driving lane if necessary (e.g., to take an off-ramp or make a right-hand turn). Other modifications may include setting a preference for a particular lane on a multi-lane road, such as the right lane, changing a driving angle of the vehicle 105 to overcome the performance limitations (e.g., changing an angle of approach to a stop light to mitigate or overcome glare on a camera), and limiting complex driving maneuvers for the vehicle 105, such as not permitting lane changes, three-point turns, and other difficult maneuvers. Speed, acceleration, and steering direction thresholds may be used to categorize whether a driving maneuver is complex. For example, complex driving maneuvers include driving maneuvers that are performed while the vehicle is traveling at a high rate of speed, that include a high rate of acceleration, that involve multiple changes in steering direction (e.g., multi-point turn), that involve changes in steering direction above a certain angle (e.g., indicative of a lane change or turn, as opposed to a minor in-lane lateral adjustment), that use data from a number of sensors above a certain threshold (e.g., the more sensors involved, the more complex the maneuver), or combinations thereof.

Further driving behavior modifications may include adapting or reducing the speed of the vehicle 105 to provide the vehicle 105 more time to react to possible obstacles or situations while performance limitations exist. Driving behavior modifications may also include planning and choosing an alternative driving route for the vehicle 105. The alternative driving route may be selected based on a number of factors, such as possible performance limitations for the alternative driving route, the probability of a performance limitation occurring on the alternative driving route, a modified trip time, and other factors.

As noted with respect to FIG. 1 above, in some embodiments, the electronic controller 125 directly controls vehicle systems, such as braking systems, acceleration systems, and steering systems. In other embodiments, the electronic controller 125 may not have direct control over the driving behavior of the vehicle 105. Rather, for example, the system 100 may be a safety system in communication with the separate control system 130 charged with controlling the vehicle 105. In such embodiments, the electronic controller 125 may indirectly control the driving behavior of the vehicle 105 through communications with the separate control system 130. For example, the safety limitations may be output to the control system 130, which then controls the vehicle systems to modify the vehicle driving behavior. Therefore, in order to ensure that performance limitations are properly handled by the separate control system 130, the system 100 may be configured to take other measures, such as those described below with respect to FIG. 4, to modify the driving behavior of the vehicle 105.

Figure 4:
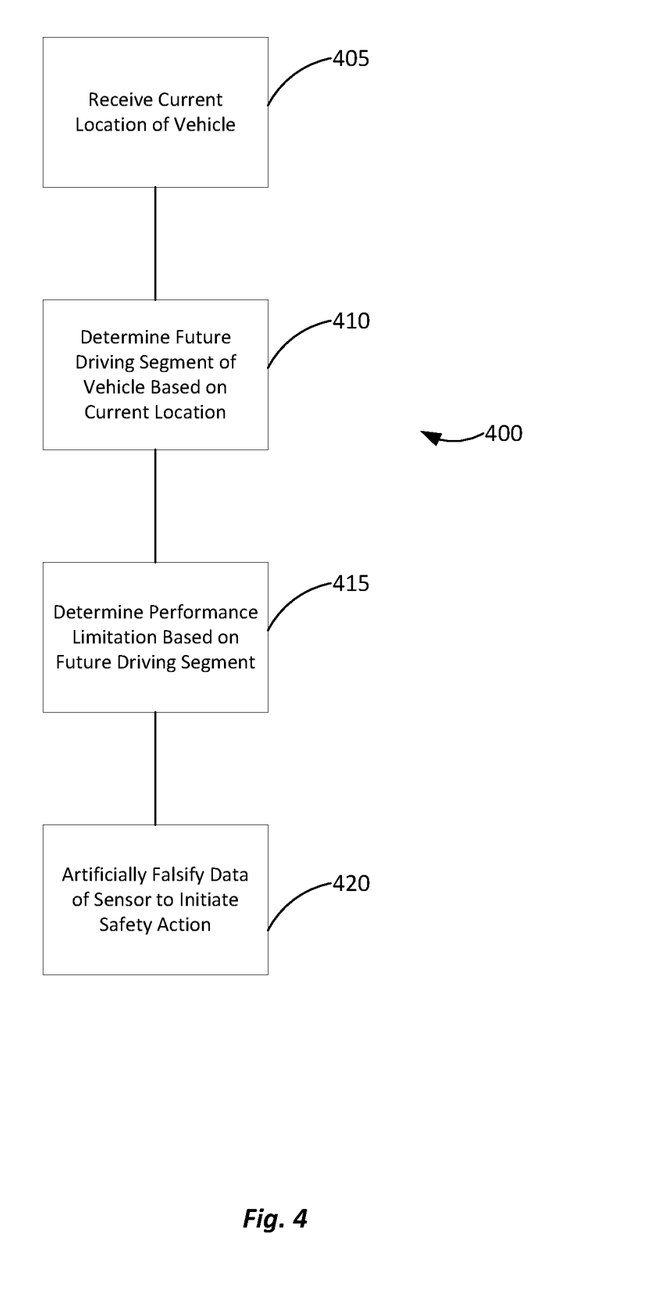
FIG. 4 illustrates a method for controlling a vehicle according to a second embodiment.

FIG. 4 illustrates a method 400 for controlling the vehicle 105 according to a second embodiment. In this embodiment, the electronic controller 125 does not directly control the actions of the vehicle 105, but instead is in communication with a separate control system 130 and provides sensor data from the plurality of sensors 120 to the separate control system 130.

Much like the method 300 described above, the method 400 includes receiving, with the electronic processor 210, a current location of the vehicle 105 from the localization system 115 (block 405) and determining, with the electronic processor 210, a future driving segment of the vehicle 105 based on the current location of the vehicle 105 (block 410). The method 400 also includes determining, with the electronic processor 210, one or more performance limitations of the plurality of sensors 120 based on the future driving segment (block 415). The explanation provided above with respect to blocks 305, 310, and 315 similarly applies to blocks 405, 410, and 415, respectively, and, accordingly, is not repeated.

The method 400 further includes artificially falsifying sensor data from at least one sensor of the plurality of sensors 120 to initiate a safety action (block 420). During operation of the vehicle 105, the electronic controller 125 provides sensor data to the separate control system 130 and the separate control system 130 controls the vehicle 105 based on the sensor data. Normally, the separate control system 130 operates by receiving sensor data from the electronic controller 125, performing data fusion, determining if the result is above a threshold, and then controls the vehicle 105 according to the determination (e.g., if the resulting data fusion is above the threshold, not initiating a safety action). As previously noted, the separate control system 130 may control one or more vehicle systems of the vehicle 105 including an acceleration system, braking system, steering system, and other systems. During operation in which performance limitations are not detected, the sensor data provided to the separate control system 130 may influence the control of the vehicle systems. For example, in response to sensor data indicating that the vehicle 105 is approaching an obstacle, the separate control system 130 may control the braking system to brake the vehicle 105. However, in response to the electronic processor 210 determining that one or more performance limitations exists in block 415, the electronic processor 210 proceeds to artificially falsify sensor data from at least one sensor of the plurality of sensors 120 to initiate a safety action (block 420). In other words, the electronic processor 210 is configured to intentionally falsify sensor quality or integrity data of at least one sensor of the plurality of sensors 105 and provide the falsified sensor quality or integrity data to the separate control system 130. The falsified sensor quality or integrity data triggers or initiates the separate control system 130 to execute a safety action for the vehicle 105 because a safety threshold is no longer met by the sensor data, such as executing one of the driving behavior modifications described above with regards to FIG. 3. Intentionally falsifying sensor quality or integrity data includes providing an intentionally false value to a model being used by the separate control system 130 for sensor data fusion. The intentionally false value causes the model to not meet a predetermined integrity level for normal operation of the vehicle 105, which causes the separate control system 130 to operate the vehicle 105 in a "degraded" safety mode. In the degraded safety mode, the separate control system 130 limits the possible driving behaviors of the vehicle 105, for example, by executing one of the driving behavior modifications described above with regards to FIG. 3. The predetermined integrity level may be set based on, for example, known industry safety standards, such as safety standards from the Institute of Electrical and Electronics Engineers ("IEEE").

The intentionally false value may be a quality value, such as a value selection from the range of 0-100 percent. In this embodiment, the intentionally false value would be provided as 0 percent or 100 percent. In another embodiment, a non-numerical value may be provided to the separate control system 130, where the separate control system 130 is expecting a numerical value to plan driving movements for the vehicle 105. In this case, because no number is received, the separate control system 130 would initiate the safety action. In yet another embodiment, the intentionally false value is a discrete value or array, such as an industry standard or a value selected from 0-5 indicating, for example, how many sensors are confirming the data. In this case, a value such as 0 or 5 is provided to the separate control system 130.

In some embodiments, the electronic processor 210 is configured to intentionally modify a particular metadata value of the sensor data based on the performance limitation. For example, a confidence, uncertainty, or integrity value of the sensor data being provided to the separate control system 130 may be modified to initiate the safety action.

The following examples illustrate example systems and methods described herein.

Example 1: A system for controlling a vehicle, the system comprising a localization system; a memory storing a digital map; at least one sensor; and an electronic processor configured to receive, from the localization system, a current location of the vehicle; determine a future driving segment of the vehicle based on the current location of the vehicle; determine at least one performance limitation based on the future driving segment of the vehicle; and artificially falsify data of the at least one sensor to initiate a safety action for the vehicle.

Example 2: the system of example 1, wherein artificially falsifying the data of the at least one sensor includes providing an intentionally false value to a model for sensor data fusion, causing the model to not meet a predetermined integrity level.

Example 3: the system of either examples 1 or 2, wherein the future driving segment includes a classification indicating a particular performance limitation.

Example 4: the system of example 3, wherein the classification includes a probability that the particular performance limitation will occur based on one or more environmental conditions.

Example 5: the system of either examples 3 or 4, wherein the classification is a classification selected from a group of classifications consisting of a binary classification, a quality class classification, an individual sensor quality class classification, and a redundancy classification.

Example 6: the system of any of examples 4-5, wherein the classification includes at least one of a static map attribute and a dynamic map attribute.

Example 7: the system of any of examples 1-6, wherein the future driving segment is further determined based upon a planned driving route of the vehicle.

Example 8: a method for controlling a vehicle, the method comprising receiving, with an electronic processor, a current location of the vehicle from a localization system; determining, with the electronic processor, a future driving segment of the vehicle based on the current location of the vehicle; determining, with the electronic processor, at least one performance limitation based on the future driving segment of the vehicle; and artificially falsifying, with the electronic processor, data of at least one sensor to initiate a safety action for the vehicle.

Example 9: the method of example 8, wherein artificially falsifying the data of the at least one sensor includes providing an intentionally false value to a model for sensor data fusion, causing the model to not meet a predetermined integrity level.

Example 10: the method of either examples 8 or 9, wherein the future driving segment includes a classification indicating a particular performance limitation.

Example 11: the method of example 10, wherein the classification includes a probability that the particular performance limitation will occur based on one or more environmental conditions.

Example 12: the method of either of examples 10 or 11, wherein the classification is a classification selected from a group of classifications consisting of a binary classification, a quality class classification, an individual sensor quality class classification, and a redundancy classification.

Example 13: the method of any of examples 10-12, wherein the classification includes at least one of a static map attribute and a dynamic map attribute.

Example 14: the method of claim 8, wherein the associated portion of the digital map is selected based upon a planned driving route of the vehicle.

Example 15: a non-transitory, computer-readable medium containing instructions that, when executed by an electronic processor, are configured to perform a set of functions, the set of functions including receiving a current location of the vehicle from a localization system; determining a future driving segment of the vehicle based on the current location of the vehicle; determining at least one performance limitation based on the future driving segment of the vehicle; and artificially falsifying data of at least one sensor to initiate a safety action for the vehicle.

Example 16: the non-transitory, computer-readable medium of example 15, wherein the future driving segment includes a classification indicating a particular performance limitation.

Example 17: the non-transitory, computer-readable medium of either examples 15 or 16, wherein the classification includes a probability that the particular performance limitation will occur based on one or more environmental conditions.

Example 18: the non-transitory, computer-readable medium of either example 16 or 17, wherein the classification is a classification selected from a group of classifications consisting of a binary classification, a quality class classification, an individual sensor quality class classification, and a redundancy classification.

Example 19: the non-transitory, computer-readable medium of any of examples 16-18, wherein the classification includes at least one of a static map attribute and a dynamic map attribute.

Example 20: the non-transitory, computer-readable medium of any examples 15-19, wherein artificially falsifying the data of the at least one sensor includes providing an intentionally false value to a model for sensor data fusion, causing the model to not meet a predetermined integrity level.

Thus, embodiments described herein provide, among other things, systems and methods for controlling a vehicle. Various features, advantages, and embodiments are set forth in the following claims.

What is claimed is:
1. A system for controlling a vehicle, the system comprising
    a localization system;
    a memory storing a digital map;
    at least one sensor; and
    an electronic processor configured to
        receive, from the localization system, a current location of the vehicle;

determine a future driving segment of the vehicle based on the current location of the vehicle;

determine at least one performance limitation of the at least one sensor or at least one algorithm based on a classification of the future driving segment of the vehicle, wherein the classification is associated with a condition of an environment of the future driving segment of the vehicle, and wherein the at least one performance limitation prevents the at least one sensor or the at least one algorithm from aiding in control of the vehicle due to unsuitable function; and artificially falsify data of the at least one sensor to initiate a safety action for the vehicle.

2. The system of claim 1, wherein artificially falsifying the data of the at least one sensor includes providing an intentionally false value to a model for sensor data fusion, causing the model to not meet a predetermined integrity level.

3. The system of claim 1, wherein the future driving segment includes the classification indicating a particular performance limitation.

4. The system of claim 3, wherein the classification includes a probability that the particular performance limitation will occur based on one or more environmental conditions.

5. The system of claim 3, wherein the classification is a classification selected from a group of classifications consisting of a binary classification, a quality class classification, an individual sensor quality class classification, and a redundancy classification.

6. The system of claim 3, wherein the classification includes at least one of a static map attribute and a dynamic map attribute.

7. The system of claim 1, wherein the future driving segment is further determined based upon a planned driving route of the vehicle.

8. A method for controlling a vehicle, the method comprising receiving, with an electronic processor, a current location of the vehicle from a localization system;

determining, with the electronic processor, a future driving segment of the vehicle based on the current location of the vehicle;

determining, with the electronic processor, at least one performance limitation of at least one sensor or at least one algorithm based on the future driving segment of the vehicle, wherein the classification is associated with a condition of an environment of the future driving segment of the vehicle, and wherein the at least one performance limitation prevents the at least one sensor or the at least one algorithm from aiding in control of the vehicle due to unsuitable function; and artificially falsifying, with the electronic processor, data of the at least one sensor to initiate a safety action for the vehicle.

9. The method of claim 8, wherein artificially falsifying the data of the at least one sensor includes providing an intentionally false value to a model for sensor data fusion, causing the model to not meet a predetermined integrity level.

10. The method of claim 8, wherein the future driving segment includes the classification indicating a particular performance limitation.

11. The method of claim 10, wherein the classification includes a probability that the particular performance limitation will occur based on one or more environmental conditions.

12. The method of claim 10, wherein the classification is a classification selected from a group of classifications consisting of a binary classification, a quality class classification, an individual sensor quality class classification, and a redundancy classification.

13. The method of claim 10, wherein the classification includes at least one of a static map attribute and a dynamic map attribute.

14. The method of claim 8, wherein the associated portion of the digital map is selected based upon a planned driving route of the vehicle.

15. A non-transitory, computer-readable medium containing instructions that, when executed by an electronic processor, are configured to perform a set of functions, the set of functions including receiving a current location of the vehicle from a localization system;

determining a future driving segment of the vehicle based on the current location of the vehicle;

determining at least one performance limitation of at least one sensor or at least one algorithm based on the future driving segment of the vehicle, wherein the classification is associated with a condition of an environment of the future driving segment of the vehicle, and wherein the at least one performance limitation prevents the at least one sensor or the at least one algorithm from aiding in control of the vehicle due to unsuitable function; and artificially falsifying data of the at least one sensor to initiate a safety action for the vehicle.

16. The non-transitory, computer-readable medium of claim 15, wherein the future driving segment includes the classification indicating a particular performance limitation.

17. The non-transitory, computer-readable medium of claim 16, wherein the classification includes a probability that the particular performance limitation will occur based on one or more environmental conditions.

18. The non-transitory, computer-readable medium of claim 16, wherein the classification is a classification selected from a group of classifications consisting of a binary classification, a quality class classification, an individual sensor quality class classification, and a redundancy classification.

19. The non-transitory, computer-readable medium of claim 16, wherein the classification includes at least one of a static map attribute and a dynamic map attribute.

20. The non-transitory, computer-readable medium of claim 15, wherein artificially falsifying the data of the at least one sensor includes providing an intentionally false value to a model for sensor data fusion, causing the model to not meet a predetermined integrity level.

* * * * *